Aug. 25, 1931.　　　S. E. TRAVIS, JR　　　1,820,850
END CLOSURE STRUCTURE FOR TRUCK BODIES
Original Filed Jan. 26, 1928
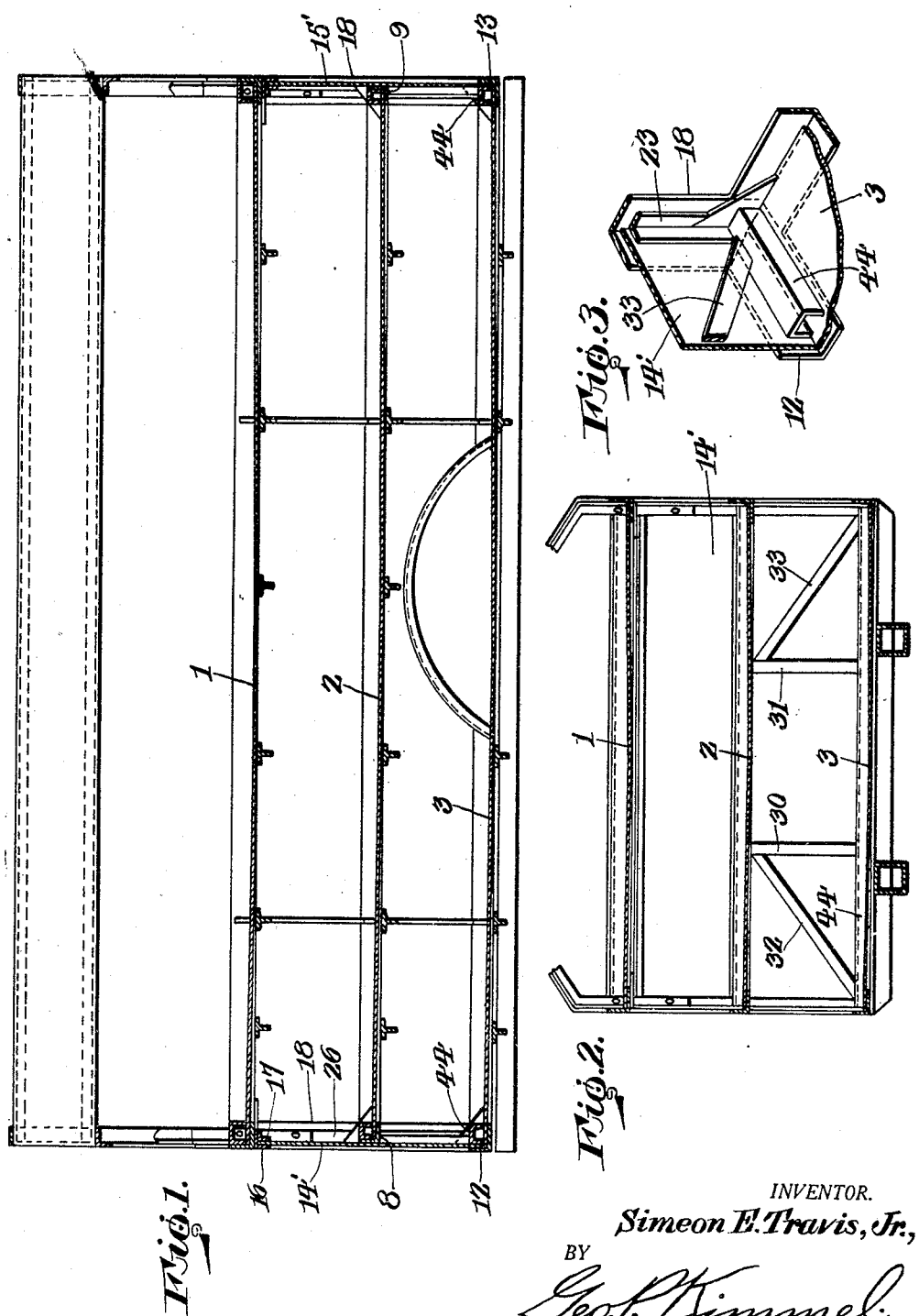
INVENTOR.
Simeon E. Travis, Jr.,
BY
Geo. P. Kimmel
ATTORNEY.

Patented Aug. 25, 1931

1,820,850

UNITED STATES PATENT OFFICE

SIMEON E. TRAVIS, JR., OF HATTIESBURG, MISSISSIPPI, ASSIGNOR TO THE WELDMECH STEEL PRODUCTS CO., A CORPORATION OF MISSISSIPPI

END CLOSURE STRUCTURE FOR TRUCK BODIES

Original application filed January 26, 1928, Serial No. 249,693. Divided and this application filed March 5, 1929. Serial No. 344,531.

This invention relates to a truck body of that type designed primarily for the handling of crated, cased or boxed bottled goods, is a division of my application filed January 26, 1928, Serial No. 249,693, and the invention has for its object to provide, in a manner as hereinafter set forth, a truck body having one or more closed end decks and further with the truck body so constructed and arranged that it can be easily loaded and unloaded and carry its load to the best advantages under all road conditions.

A further object of the invention resides in a new and novel construction of braced closure structure for each of the ends of the truck body, and with each closure structure common to corresponding ends of the decks provided by the truck body.

Further objects of the invention are to provide, in a manner as hereinafter set forth, a truck body designed to be attached to any form of chassis and which is simple in its construction and arrangement, strong, durable, compact, thoroughly efficient when used, readily installed with respect to the chassis, of minimum weight and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

Referring to the drawings in detail wherein like reference characters denote corresponding parts throughout the several views:

Figure 1 is a longitudinal sectional view of the truck body in accordance with this invention.

Figure 2 is a transverse sectional view of the truck body.

Figure 3 is a fragmentary view in perspective of one of the lower corners of the truck body.

The truck body is illustrated formed of an upper deck 1, an intermediate deck 2 and a lower deck 3. The specific manner of setting up the truck body to provide the decks will not be referred to herein, as it is fully set forth in my application aforesaid, however, reference will be made to the elements of each of the decks which coact with the subject matter of this application, which is the braced closure structure for the ends of the truck body.

The upper deck 1 includes a pair of oppositely disposed, inverted, angle-shaped rails 16 secured to the bottom of deck 1 at the ends thereof, a pair of oppositely disposed, inverted angle-shaped retaining members 17, each secured to and arranged within a rail member 16 and having its vertical leg opposing and spaced from the vertical leg of such rail to form what may be termed a pocket.

The intermediate deck includes a pair of oppositely disposed, angle-shaped rails 8, 9 positioned at the ends thereof. The lower deck includes a pair of angle-shaped rails 12, 13 positioned at the ends thereof and each having an inverted channel iron 44 mounted on the longitudinal leg and spaced from the vertical leg thereof.

The truck body includes four vertically disposed, angle-shaped corner rails which are common to the decks 1, 2 and 3.

For the forward end of the truck body a closure plate 14' is provided which is common to the decks 2, 3. The bottom of plate 14' is seated on the horizontal leg of rail 12, and positioned between the vertical leg of such rail and channel iron 44. The plate 14' is positioned against the outer face of the vertical leg of rail 8 and has its upper end extended into the pocket formed between the front rail 16 and front retaining member 17. The plate 14' extends from one forward corner rail to the other forward corner rail and is confined within such corner rails 18. Positioned within the forward corner rails 18 and between the decks 2 and 3 are retaining members 23 which abut the plate 14'. Positioned within the forward corner rails 18 and arranged between the decks 1 and 2 are retaining members 26 which abut the plate 14'.

Arranged at the rear ends of the decks 2 and 3 is a closure plate 15' which is set up in the same manner with respect to the rear end rails and the forward corner rails 18, as the plate 14' is set up with respect to the forward end and corner rails, that is to say, the plate 15' is seated on the end rail 13, abuts against vertical leg of the end rail 9, extends into the pocket formed by the rear rail 16 and rear retaining member 17 and is arranged within the pair of rear corner rails.

The braced end closure structure for the forward end of the truck body is constructed in the same manner as the braced end closure structure for the rear end of the truck body. The closure structures being common to the intermediate and lower decks.

The bracing portion of each end closure which also may be termed a truss reinforcement consists of a pair of spaced, vertically disposed, combined supporting and reinforcing members 30, 31 and a pair of oppositely disposed, inclined reinforcing and bracing members or uprights 32, 33 which extend from the upper ends of members 30, 31 to the lower deck 3. The members 30, 31 are interposed between the channel irons 44 and the end rails 8, 9. The lower ends of the members 32, 33 are mounted on the channel irons 44.

The members 30 to 33 provide a truss arrangement. The members 32, 33 do not abut against the end rails 8, 9 but abut against the uprights 30, 31. The members 30, 31 which are in the form of uprights are disposed between the vertical median of the truck body and the sides thereof and the members 32, 33 extend to a point in close proximity to the corner rails 18. The braced end closures for the truck body are suitably welded to the latter.

What I claim is:

1. A truck body comprising an upper, intermediate and a lower deck, each of said decks including an end rail of L-shaped cross section, an angle iron secured to the lower face of the horizontal portion of the end rail of the upper deck and depending therefrom, a closure plate, said plate at its upper end abutting the horizontal portion of said angle iron, said plate further opposing the outer face of the end rail of the intermediate deck and extending into and supported from the end rail of the lower deck, means for connecting said plate to said angle iron, and means for securing said plate against the end rail of the lower deck.

2. A truck body comprising an upper, an intermediate and a lower deck, each of said decks including an end rail of L-shaped cross section, an angle iron secured to the lower face of the horizontal portion of the end rail of the upper deck and depending therefrom, a closure plate, said plate at its upper end abutting the horizontal portion of the angle iron, said plates further opposing the outer face of the end rail of the intermediate deck and extending into and supported from the end rail of the lower deck, means for connecting said plate to said angle iron, means for securing said plate against the end rail of the lower deck, and truss reinforcement between said end rails of the intermediate and lower decks and abutting against the inner face of that portion of said plate arranged between said intermediate and lower decks.

3. A truck body comprising an upper, intermediate and a lower deck, each of said decks including an end rail of L-shaped cross section, an angle iron secured to the lower face of the horizontal portion of the end rail of the upper deck and depending therefrom, a closure plate, said plate at its upper end abutting the horizontal portion of said angle iron, said plate further opposing the outer face of the end rail of the intermediate deck and extending into and supported from the end rail of the lower deck, means for connecting said plate to said angle iron, and means for securing said plate against the end rail of the lower deck, said plate positioned inwardly with respect to the vertical face of the said end rails of the upper and lower decks.

4. A truck body comprising an upper, an intermediate and a lower deck, each of said decks including an end rail of L-shaped cross section, a closure plate having its top edge positioned in close proximity to the bottom of the upper deck, a portion thereof opposing the outer face of said end rail of the intermediate deck and its lower portion extending into and supported from an end rail of the lower deck, means for connecting said plate to the upper deck, means for securing said plate to the end rail of the lower deck, spaced vertical braces between the end rail of the intermediate deck and the means for securing the plate to the end rail of the lower deck, and inclined braces abutting said vertical braces and further abutting the means for securing the plate to the end rail of the lower deck, said vertical and inclined braces abutting against the inner face of said plate between said intermediate and lower decks.

In testimony whereof, I affix my signature hereto.

SIMEON E. TRAVIS, Jr.